United States Patent
Bang et al.

(10) Patent No.: US 9,276,314 B2
(45) Date of Patent: Mar. 1, 2016

(54) CENTRAL NODE APPARATUS AND METHOD FOR TRANSMITTING WIRELESS SIGNALS BETWEEN CENTRAL OFFICE NODE AND REMOTE NODE USING BEAM PATTERNS AND ANTENNA POLARIZATION

(71) Applicant: Electronics and Telecommunications Research Institute, Daejeon-si (KR)

(72) Inventors: Young-Jo Bang, Daejeon-si (KR); Youn-Ok Park, Daejeon-si (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 236 days.

(21) Appl. No.: 14/053,043

(22) Filed: Oct. 14, 2013

(65) Prior Publication Data

US 2014/0106807 A1 Apr. 17, 2014

(30) Foreign Application Priority Data

Oct. 15, 2012 (KR) .................. 10-2012-0114353
Jun. 5, 2013 (KR) .................. 10-2013-0064934

(51) Int. Cl.

| | | |
|---|---|---|
| *H01Q 21/24* | (2006.01) | |
| *H01Q 3/34* | (2006.01) | |
| *H01Q 25/00* | (2006.01) | |
| *H04B 7/06* | (2006.01) | |
| *H04B 7/08* | (2006.01) | |
| *H04B 7/10* | (2006.01) | |

(52) U.S. Cl.
CPC ................. *H01Q 3/34* (2013.01); *H01Q 21/24* (2013.01); *H01Q 25/001* (2013.01); *H04B 7/0617* (2013.01); *H04B 7/0682* (2013.01); *H04B 7/0885* (2013.01); *H04B 7/10* (2013.01)

(58) Field of Classification Search
CPC .......... H04B 7/10; H04B 7/04; H04B 7/0602; H04B 7/0408; H04B 7/0491; H04B 7/0617; H04B 7/086; H01Q 3/36; H01Q 9/0435; H01Q 9/0457; H01Q 21/24
See application file for complete search history.

(56) References Cited

U.S. PATENT DOCUMENTS

| | | | |
|---|---|---|---|
| 7,181,245 B2 * | 2/2007 | Smith et al. ................. | 455/562.1 |
| 8,306,473 B2 * | 11/2012 | Anreddy et al. ................. | 455/39 |
| 2001/0052874 A1 * | 12/2001 | Ito ................. | 342/368 |
| 2004/0038713 A1 * | 2/2004 | Okawa et al. ................. | 455/561 |
| 2006/0066481 A1 * | 3/2006 | Goldberg ................. | 342/378 |
| 2007/0072646 A1 * | 3/2007 | Kuwahara et al. ............ | 455/561 |
| 2007/0205955 A1 * | 9/2007 | Korisch et al. ................. | 343/853 |
| 2009/0284415 A1 * | 11/2009 | Worl et al. ................. | 342/372 |

(Continued)

FOREIGN PATENT DOCUMENTS

| | | |
|---|---|---|
| EP | 1923954 A1 | 5/2008 |
| KR | 10-2005-0012846 A | 2/2005 |

(Continued)

*Primary Examiner* — Sujatha Sharma
(74) *Attorney, Agent, or Firm* — LRK Patent Law Firm

(57) ABSTRACT

A central office node using beam patterns and antenna polarizations, a remote node, and a wireless communication method between the nodes. The central office node includes: a first antenna array with first polarization attributes; a second antenna array with second polarization attributes; and a transmitter unit configured to transmit data to a plurality of remote nodes using beam patterns generated during beamforming and the polarization of the first and second antenna arrays.

16 Claims, 6 Drawing Sheets

(56) References Cited

U.S. PATENT DOCUMENTS

| | | | |
|---|---|---|---|
| 2010/0130223 A1* | 5/2010 | Liao et al. | 455/453 |
| 2010/0298015 A1* | 11/2010 | Medbo et al. | 455/501 |
| 2012/0275499 A1 | 11/2012 | Anreddy et al. | |
| 2013/0157601 A1* | 6/2013 | O'Keeffee et al. | 455/226.1 |
| 2015/0022421 A1* | 1/2015 | Vigano et al. | 343/853 |

FOREIGN PATENT DOCUMENTS

| | | |
|---|---|---|
| KR | 10-2012-0025583 A | 3/2012 |
| WO | 2004/004156 A1 | 1/2004 |

* cited by examiner

CENTRAL NODE APPARATUS AND METHOD FOR TRANSMITTING WIRELESS SIGNALS BETWEEN CENTRAL OFFICE NODE AND REMOTE NODE USING BEAM PATTERNS AND ANTENNA POLARIZATION

CROSS-REFERENCE TO RELATED APPLICATION(S)

This application claims priority from and the benefit under 35 U.S.C. §119(a) of Korean Patent Application Nos. 10-2012-0114353, filed on Oct. 15, 2012, and 10-2013-0064934, filed on Jun. 5, 2013, which are hereby incorporated by references for all purposes as if fully set forth herein.

BACKGROUND

1. Field

The following description relates to wireless communications, and more particularly, to wireless communication using beamforming.

2. Description of the Related Art

Generally, when a signal power is focused on an intended receiver or transmitter, beamforming takes place. Signal transmission and reception may derive advantages from beam patterns in contrast to omnidirectional patterns. From the view of a transmitter, beamforming allows the reduction of power required for transmission and power that causes interference to unintended receivers. From the view of a receiver, beamforming enables the reinforcement of an intended reception signal, and the reduction of interference from other transmitters or signal sources.

In a wireless communication system, the use of beamforming makes it possible for nodes to communicate with each other. For example, in a wireless backhaul network, a central office that is connected with a core network communicates with a plurality of remote nodes via wireless beams using carrier frequencies greater than 10 GHz.

In the wireless backhaul network, the central office uses beam patterns via multiple antennas when transmitting and receiving a large amount of data to and from a plurality of remote nodes, and thereby the data transmission and reception are executed without interferences between the remote nodes. However, if a distance between two remote nodes is much shorter, when compared to a distance between a transmitter antenna and a receiver antenna, an angle between two beam patterns may become too small, so that the beamforming may be difficult to implement.

SUMMARY

The following description relates to a wireless communication method that increases transmission capacity between a central office node and remotes nodes using beam patterns and antenna polarization, which can form a beam in a way that minimizes signal interferences, and thereby increasing transmission capacity of a network.

In one general aspect, there is provided a central office node including: a first antenna array with first polarization attributes; a second antenna array with second polarization attributes; and a transmitter unit configured to transmit data to a plurality of remote nodes using beam patterns generated during beamforming and the polarizations of the first and second antenna arrays. One of the first antenna array and the second antenna array may have vertical polarization, and the other may have horizontal polarization. The central office node may be an apparatus that connects a core network and a plurality of base stations by communicating with the plurality of base stations in a wireless backhaul network.

If an angle between beam patterns to be transmitted is greater than a predefined reference angle, the transmitter unit may transmit data using beam patterns through a plurality of antennas, and if the angle between beam patterns is smaller than the reference angle, the transmitter unit may transmit data using, at least once, each of the first antenna array and the second antenna array, which have different polarizations from each other. An angle between the beam patterns may be calculated based on a distance between a transmitter antenna and a receiver antenna and a distance between remote nodes.

The transmitter unit may be configured to include a data distribution unit configured to divide entire data into pieces of data to be transmitted to the respective remote nodes, a data modulation unit configured to modulate the divided pieces of data, a first transmission beamforming unit configured to form a first beam pattern by allocating the modulated data to the first antenna array, and a second transmission beamforming unit configured to form a second beam pattern by allocating the modulated data to the second antenna array.

The central office node may further include a receiver unit configured to receive data through each of the first and second antenna arrays. The receiver unit may be configured to include a first reception beamforming unit configured to receive data through the first antenna array by forming a first beam pattern, a second reception beamforming unit configured to receive data through the second antenna array by forming a second beam pattern, a data demodulation unit configured to demodulate each data received through the first reception beamforming unit and the second reception beamforming unit, and a data combining unit configured to combine data demodulated by the data demodulation unit.

In another general aspect, there is provided a remote node including: a single-polarized antenna array with single-polarized wave characteristics; a transceiver unit configured to receive data through the single-polarized antenna array wherein the data is transmitted from a central office node using a beam pattern and polarizations of an antenna array, and to transmit data to the central office node through the single-polarized antenna array; and a polarization angle control unit configured to control a polarization angle of the single-polarized antenna array.

The polarization angle control unit may be configured to switch according to the polarizations of the antenna array of the central office node.

The remote node may be a base station that is connected to a core network via the central office node in a wireless backhaul network.

In yet another general aspect, there is provided a wireless communication method of a central office node to communicate with a plurality of remote nodes, the wireless communication method including: being provided with a first antenna array and a second antenna array, which have different polarization characteristics from each other; and transmitting data using beam patterns generated during beamforming and polarization of each of the antennae arrays.

One of the first antenna array and the second antenna array may have vertical polarization and the other may have horizontal polarization.

The transmission of the data may include, if an angle between beam patterns to be transmitted is greater than a predefined reference angle, transmitting data using beam patterns through a plurality of antennas, and, if the angle between beam patterns is, smaller than the reference angle, transmitting data using, at least once, each of the first antenna array and the second antenna array, which have different polarizations from each other. An angle between the beam patterns may be calculated based on a distance between a transmitter antenna and a receiver antenna and a distance between remote nodes.

The transmission of the data may include dividing entire data into pieces of data to be transmitted to the respective remote nodes, modulating the divided pieces of data, and forming beam patterns by allocating the modulated data to the respective first and second antenna arrays, which have different polarizations.

The wireless communication method may further include receiving data through each of the first and second antenna arrays. The receiving of the data may include receiving data through the first antenna array by forming a first beam pattern, receiving data through the second antenna array by forming a second beam pattern, demodulating each of the received data; and combining the demodulated data.

Other features and aspects will be apparent from the following detailed description, the drawings, and the claims.

Figure 1:
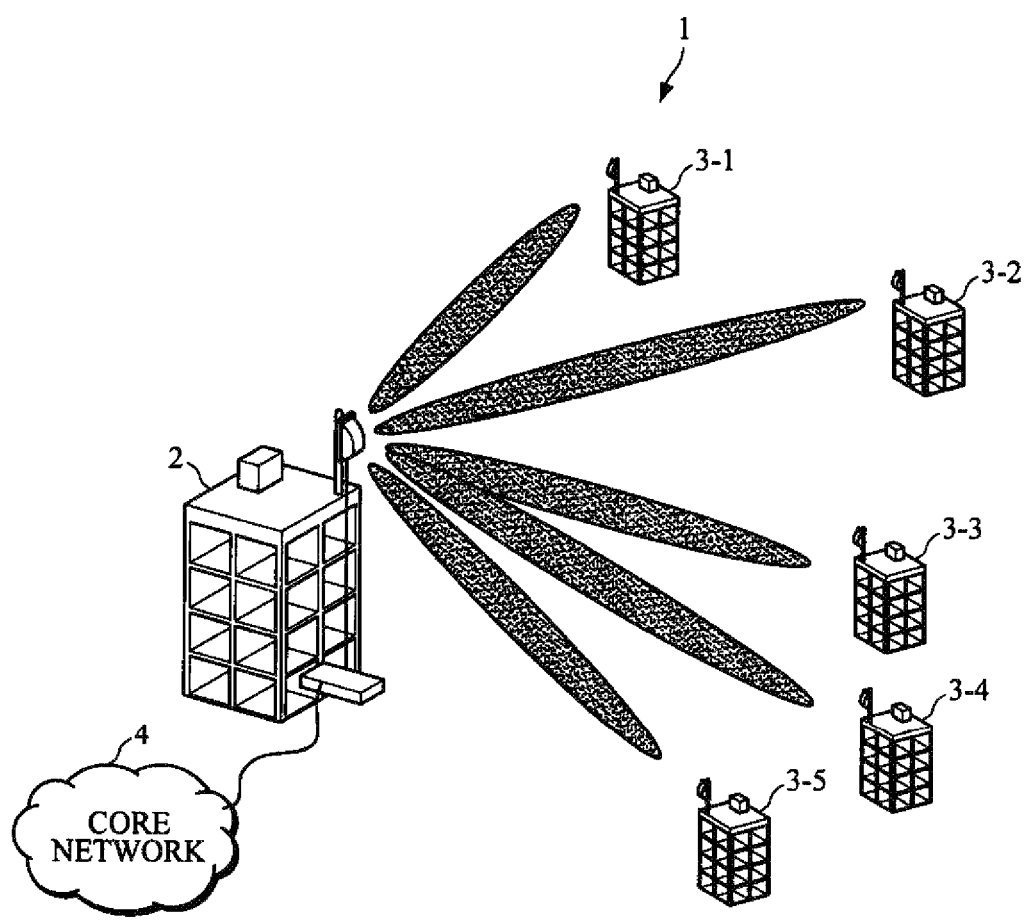
FIG. 1 is a diagram illustrating a wireless communication system according to an exemplary embodiment of the present invention.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

FIG. 1 is a diagram illustrating a wireless communication system according to an exemplary embodiment of the present invention.

The present invention relates to wireless communications between a central office 2 and each of a plurality of remote nodes 3-1, 3-2, . . . 3-5 using beamforming. Referring to FIG. 1, the exemplary embodiment of the present invention may be applicable to a wireless backhaul network 1. In the wireless backhaul network 1, the central office 2 connected to a core network 4 uses beamforming to transmit and receive data to and from the remote nodes 3-1, 3-2, . . . , 3-5 through carrier frequencies greater than 10 GHz. The wireless backhaul network 1 enables a small-cell base station-based wireless network to be, flexibly connected to a mobile core network by providing wireless backhaul of IP infrastructure network, which includes a next-generation mobile communication network, thereby allowing for smooth establishment of a mobile wireless network at a reduced cost.

In FIG. 1, only the wireless backhaul network 1 is provided as a wireless network to facilitate understanding, but the aspects of the present invention are not limited thereto, such that any wireless networks that use beamforming for wireless communications between the central office 2 and the remote nodes 3-1, 3-2, 3-5, are applicable, and the central office 2 and the remote nodes 3-1, 3-2, . . . , 3-5 may vary in number, and be connected in different forms.

The remote nodes 3-1, 3-2, . . . , 3-5 each may be a base station. The base station may be a fixed station that communicates with terminals, and also may be referred to as an access point, node B, evolved node B (eNB), or the like. The base station may provide communication coverage with respect to a particular geographical area. The entire communication coverage of the base, station may be divided into smaller areas, which are referred to as "cells" and, served by subsystems of the base station. A "cell" may refer to a coverage area of a base station or a base station subsystem that serves the coverage area, depending on the context.

The base station may provide communication coverage with respect to various types of cells, such as macro cells, pico-cells, femto-cells, and the like. A macro cell can cover a comparatively wide geometrical area (e.g., an area with a radius of several kilometers), and support communication between all terminals that are subscribed to a service within a wireless network. A pico-cell can cover a comparatively small geometrical area, and support communication between all terminals that are subscribed to a service. A femto-cell also can cover a comparatively small geometrical area (e.g., a home), and support communication between sets of associated terminals (e.g., terminals belonging to home inhabitants). With respect to the macro cell, the base station may be referred to as a macro base station. In the same manner, with respect to the pico-cell, the base station may be referred to as a pico base station, and with respect to the femto-cell, the base station may be referred to as a femto or home base station.

The central office 2 couples sets of base stations together, and controls and calibrates the base stations. The central office 2 may communicate with the base stations through backhaul networks. The backhaul network for each base station may be implemented as an arbitrary interface, or have an arbitrary capacity.

Although not illustrated in FIG. 1, terminals connected to the remote nodes 3-1, 3-2, 3-5 may be fixed wireless terminals or mobile terminals, and may be referred to as access terminals (ATs), mobile stations (MS), user equipment (UE), subscriber units, and the like. The terminals may be cellular phones, personal digital assistants (PDAs), or wireless modems, wireless remote nodes, mobile devices, laptop computers, wireless phones, wireless local loop (WLL) stations, and the like. The terminals may each communicate with the remote nodes 3-1, 3-2, . . . , 3-5 through downlink and uplink.

Figure 2:
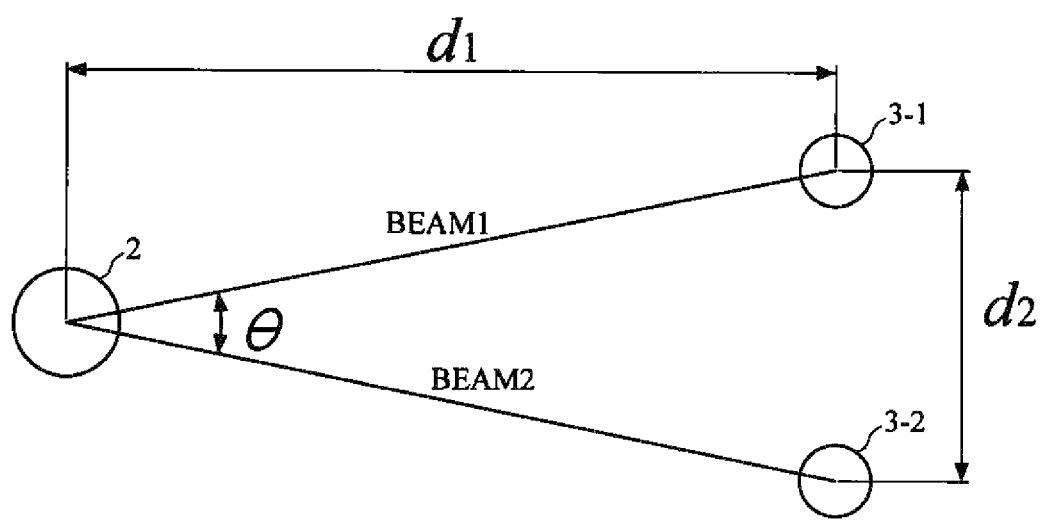
FIG. 2 is a diagram showing an angle formed between two beam patterns in a wireless backhaul network according to an exemplary embodiment of the present invention.

FIG. 2 is a diagram showing an angle formed between two beam patterns in a wireless backhaul network according to an exemplary embodiment of the present invention.

Referring to FIG. 2, an angle between beam patterns may be calculated using a distance $d_1$ between a transmission antenna and a receiver antenna and a distance $d_2$ between two remote nodes. The angle can be calculated by equation 1 below.

$$\theta = 2\tan^{-1}\frac{d_2}{2d_1} \quad (1)$$

In one example, when the distance between the transmitter antenna and the receiver antenna is 100 m, and the distance between the two remote nodes is 20 m, the angle between beam patterns is obtained as about 11 degrees by Equation 1, and thus it is possible to form a beam with no beam interference. However, when the distance between the transmitter antenna and the receiver antenna is increased to 1 km, the angle between beam patterns is narrowed to less than 2 degrees, so that it is not possible to form a beam with no beam interference.

Therefore, in the exemplary embodiment of the present invention, beam patterns and antenna polarization are used so that the central office can form a beam without interferences between remote nodes even when a distance between the remote nodes is much shorter compared to a distance between the transmitter antenna and the receiver antenna. In this case, the central office may include multiple dual-polarized antennas, and each remote node may include multiple single-polarized antennas. Hereinafter, configurations of the central office and remote node will be described in detail with reference to FIGS. 3 and 4.

Figure 3:
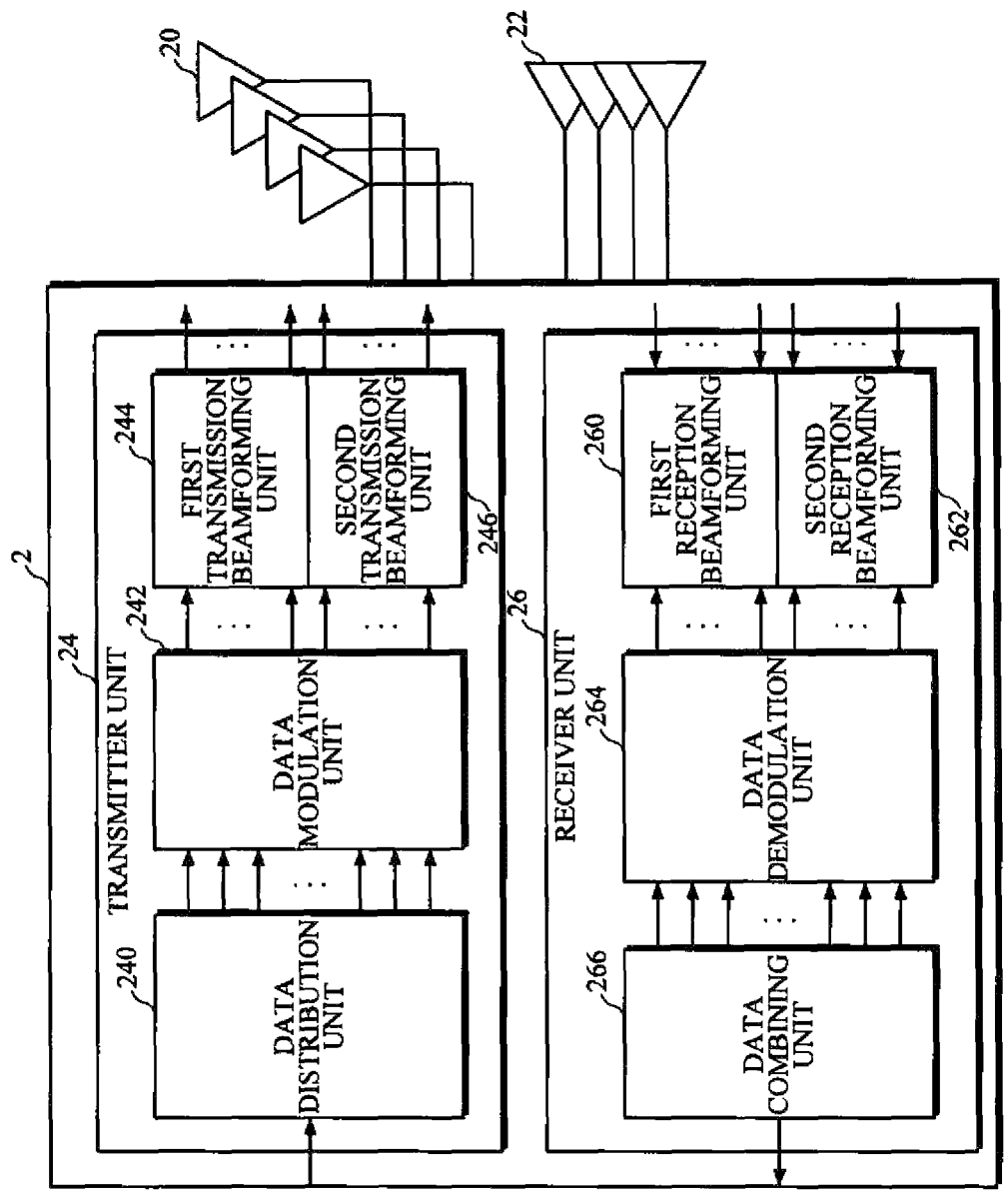
FIG. 3 is a diagram illustrating in detail a central office according to an exemplary embodiment of the present invention.

FIG. 3 is a diagram illustrating in detail a central office according to an exemplary embodiment of the present invention.

Referring to FIG. 3, the central office 2 includes a first antenna array 20, a second antenna array 22, a transmitter unit 24 and a receiver unit 26.

The first antenna array 20 and the second antenna array 22 each include a number of antennas arranged in an array, and have different polarizations. For example, antennas of the first antenna array 20 may have vertical polarizations, and antennas of the second antenna array 22 may have horizontal polarizations. FIG. 3 only illustrates the first antenna array 20 and the second antenna array 22, but the aspects of the invention are not limited thereto, such that two or more antenna arrays with different polarizations may be further included.

The transmitter unit 24 transmits data to remote nodes using the polarizations of each antenna array and beam patterns formed during beamforming. At this time, when an angle between beam patterns to be transmitted is greater than a predefined reference angle, the transmitter unit 24 may form beam patterns through the existing process (or using the existing method) and transmit the data. On the contrary, when the angle between beam patterns to be transmitted is smaller than the reference angle, the transmitter unit 24 transmits the data using, at least once, each of the first antenna array 20 and the second antenna array 22, which have different polarizations. In one example, when an angle between beam patterns from the central office 2 to remote node 1 and to remote node 2 is small, the central office 2 transmits data by forming a vertical beam pattern between the antenna array of the central office 2 with vertical polarization and an antenna array of remote node 1, and forming a horizontal beam pattern between the antenna array of the central office 2 with horizontal polarization and an antenna array of remote node 2.

In one example, the transmitter unit 24 includes a data distribution unit 240, a data modulation unit 242, a first transmission beamforming unit 244, and a second transmission beamforming unit 246.

The data distribution unit 240 divides the entire data into pieces of data to be transmitted to each remote node. The data modulation unit 242 modulates the divided data according to specifications. The first beamforming unit 244 allocates the modulated data to the first antenna array 20 to form a first beam pattern, and the second beamforming unit 246 allocates the modulated data to the second antenna array 22 to form a second beam pattern.

The receiver unit 26 receives data through the first antenna array 20 and the second antenna array 22. In one example, the receiver unit 26 includes a first reception beamforming unit 260, a second reception beamforming unit 262, a data demodulation unit 264, and a data combining unit 266.

More specifically, the first reception beamforming unit 260 forms a first beam pattern, and receives data through the first antenna array 20, and the second reception beamforming unit 262 forms a second beam pattern, and receives data through the second antenna array 22. The data demodulation unit 264 demodulates each of the data received by the first beamforming unit 260 and the second beamforming unit 262. The data combining unit 266 combines the pieces of data demodulated by the data demodulation unit 262, and delivers combined data to a core network.

Figure 4:
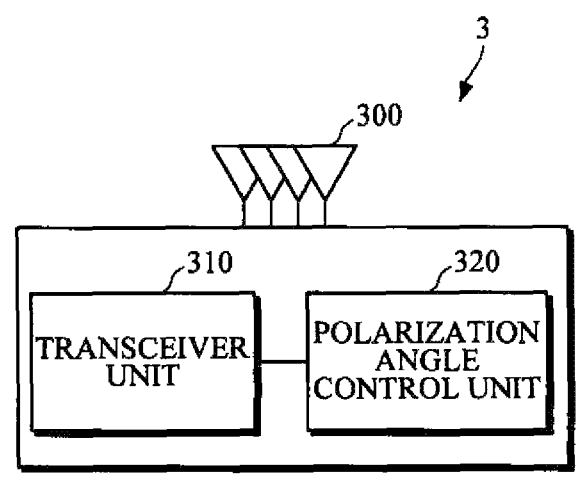
FIG. 4 is a diagram illustrating in detail a remote node according to an exemplary embodiment of the present invention.

FIG. 4 is a diagram illustrating in detail a remote node according to an exemplary embodiment of the present invention.

Referring to FIG. 4, the remote node 3 includes a single-polarized antenna array 300, a transceiver unit 310, and a polarization angle control unit 320.

The single-polarized antenna array 300 has characteristics in single-polarized wave. For example, the single-polarized antenna array 300 may have vertical polarization or horizontal polarization. In response to data transmitted from a central office using beam patterns and polarization of an antenna array, the transceiver unit 310 receives the data through the single-polarized antenna 300. In addition, the transceiver unit 310 transmits data through the single-polarized antenna array 300. The polarization angle control unit 320 controls a polarization angle of the single-polarized antenna array for data transmission/reception, and switches, according to the polarizations of the antenna array of the central office.

Figure 5:
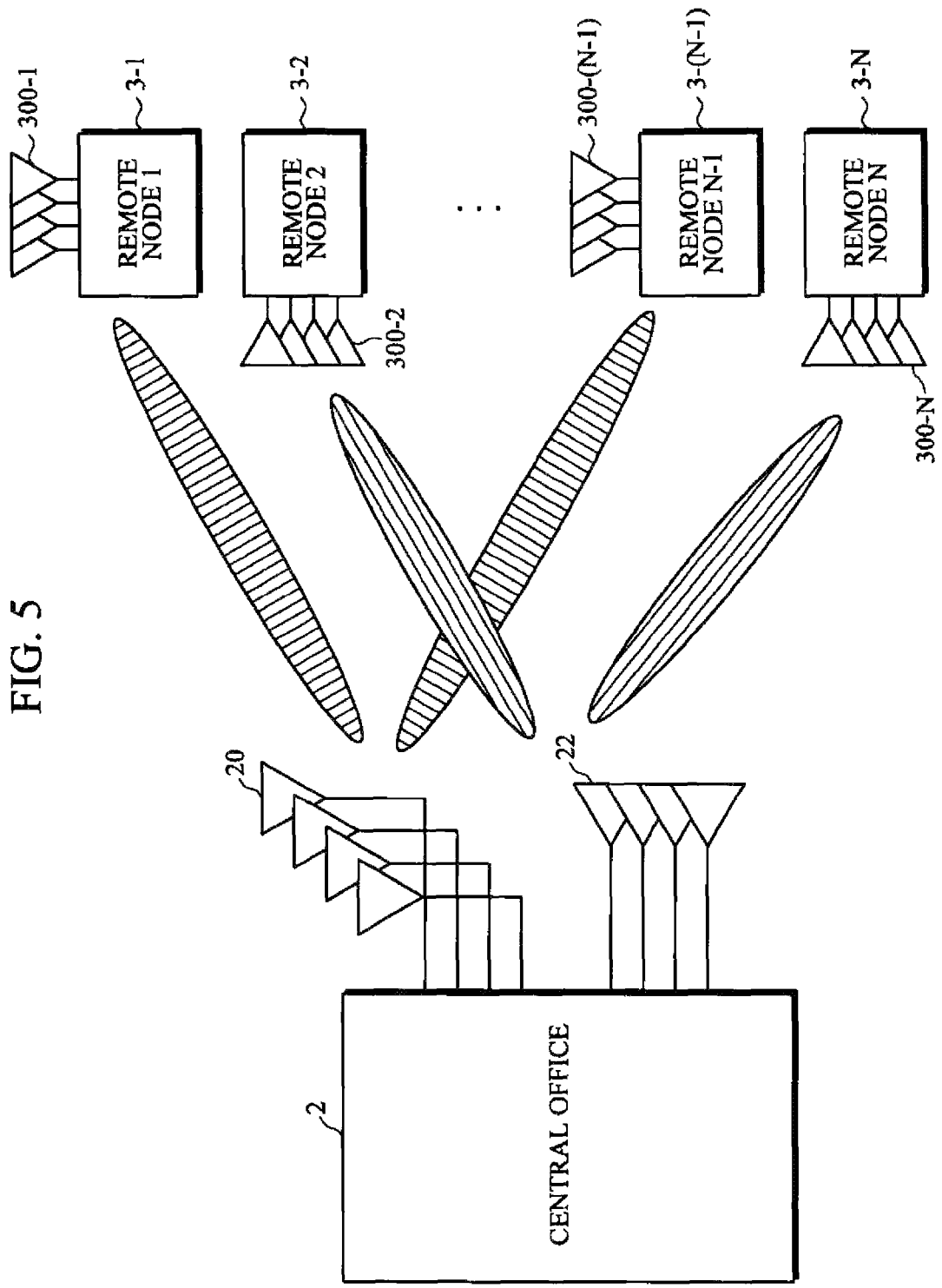
FIG. 5 is a diagram illustrating an example of forming beams with no interferences during wireless communications between a central office and a plurality of remote nodes.

FIG. 5 is a diagram illustrating an example of forming beams with no interferences during wireless communication between a central office and a plurality of remote nodes.

Referring to FIG. 5, the central office 2 transmits data to the plurality of remote nodes 3-1, 3-2, . . . , 3-5 using beam patterns generated during beamforming and polarizations of each antenna array. In this case, when an angle between beam patterns to be transmitted is greater than a predefined reference angle, the central office 2 forms beam patterns through the existing process, and transmits data using the beam patterns. On the other hand, if the angle between beam patterns to be transmitted is smaller than the reference angle, the central office 2 transmits data using the first antenna array 20 and the second antenna array 22; each is used at least once.

The example shown in FIG. 5 assumes that the first antenna array 20 has vertical polarization, characteristics, and the second antenna array 22 has horizontal polarization. In this case, if an angle between beam patterns from the central node 2 to remote node 1 3-1 and to remote node 2 3-2 is small, the central office 2 transmits data to remote node 1 3-1 and remote node 2 3-2 by forming a vertical beam pattern between the first antenna array 20 with vertical polarization and an antenna array 300-1 of remote node 1 (3-1) and a horizontal beam pattern between the second antenna array 22 with horizontal polarization and an antenna array 300-2 of remote node 2 (3-2).

In the same manner, if an angle between beam patterns from the central node 2 to remote node N-1 3-(N-1) and to remote node N 3-N is small, the central office 2 transmits data to remote node N-1 3-(N-1) and remote node N 3-N by forming a vertical beam pattern between the first antenna array 20 with vertical polarization and an antenna array 300-(N-1) of remote node N-1 3-(N-1) and a horizontal beam pattern between the second antenna array 22 with horizontal polarization and an antenna array 300-N of remote node N (3-N).

Figure 6:
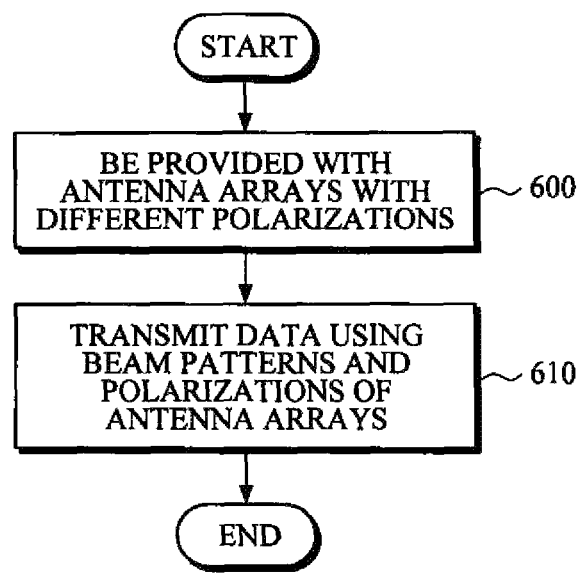
FIG. 6 is a flowchart illustrating a wireless communication method according to an exemplary embodiment of the present invention.

FIG. 6 is a flowchart illustrating a wireless communication method according to an exemplary embodiment of the present invention.

Referring to FIGS. 1 and 6, in 600, the first and second antenna arrays, which have different polarizations from each other, are provided to the central office 2 to communicate with a plurality of remote nodes 3-1, 3-2, ..., 3-5. One of the first and second antenna arrays may have vertical polarization, and the other may have horizontal polarization.

In 610, the central office 2 transmits data using beam patterns generated during beamforming and polarization of each antenna array. At this time, if an angle between beam patterns to be transmitted is greater than a predefined reference angle, the central office 2 may transmit data using beam patterns through a number of antennas. However, if an angle between beam patterns is smaller than the reference angle, the central office 2 transmits data using, at least once, each of the antenna arrays with different polarizations. The angle between the beam patterns may be calculated based on a distance between a transmitter antenna and a receiver antenna, and a distance between remote nodes.

In 610, the central office 2 divides the entire data into pieces of data to be transmitted to each remote node, modulates the divided data, and allocates the modulated data to the respective antenna arrays with different polarizations to form beam patterns.

Furthermore, the central office 2 receives data through the antenna arrays. More specifically, the central office 2 forms a first beam pattern to receive data through the first antenna array, and forms a second beam pattern to receive data through the second antenna array.

In addition, the central office 2 demodulates the received data, then combines the demodulated data, and transmits combined data to a core network.

According to the exemplary embodiments as described above, a central office uses beam patterns and antenna's polarizations to transmit and receive a large amount of data to and from a plurality of remote nodes, thereby minimizing wave interferences between the remote nodes and, accordingly, being able to significantly increase the transmission capacity in a wireless communication network, particularly, a wireless backhaul network. Furthermore, the exemplary embodiments are applicable to small base stations, such as micro base stations and pico base stations, to expand the transmission capacity of a network.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A central office node comprising:
a first antenna array with first polarization attributes;
a second antenna array with second polarization attributes; and
a transmitter unit configured to transmit data to a plurality of remote nodes using beam patterns generated during beamforming and the polarizations of the first and second antenna arrays,
wherein an angle between the beam patterns is calculated based on a distance between a transmitter antenna and a receiver antenna and a distance between remote nodes.

2. The central office node of claim 1, wherein one of the first antenna array and the second antenna array has vertical polarization, and the other has horizontal polarization.

3. The central office node of claim 1, wherein if an angle between beam patterns to be transmitted is greater than a predefined reference angle, the transmitter unit transmits data using beam patterns through a plurality of antennas, and if the angle between beam patterns is smaller than the reference angle, the transmitter unit transmits data using, at least once, each of the first antenna array and the second antenna array, which have different polarizations from each other.

4. The central office node of claim 1, wherein:
the transmitter unit is configured to comprise:
a data distribution unit configured to divide entire data into pieces of data to be transmitted to the respective remote nodes,
a data modulation unit configured to modulate the divided pieces of data,
a first transmission beamforming unit configured to form a first beam pattern by allocating the modulated data to the first antenna array, and
a second transmission beamforming unit configured to form a second beam pattern by allocating the modulated data to the second antenna array.

5. The central office node of claim 1, further comprising:
a receiver unit configured to receive data through each of the first and second antenna arrays.

6. The central office node of claim 5, wherein the receiver unit is configured to comprise a first reception beamforming unit configured to receive data through the first antenna array by forming a first beam pattern, a second reception beamforming unit configured to receive data through the second antenna array by forming a second beam pattern, a data demodulation unit configured to demodulate each data received through the first reception beamforming unit and the second reception beamforming unit, and a data combining unit configured to combine data demodulated by the data demodulation unit.

7. The central office node of claim 1 being an apparatus that connects a core network and a plurality of base stations by communicating with the plurality of base stations in a wireless backhaul network.

8. A remote node comprising:
a single-polarized antenna array with single-polarized wave characteristics;
a transceiver unit configured to receive data through the single-polarized antenna array wherein the data is transmitted from a central office node using a beam pattern and polarizations of an antenna array, and to transmit data to the central office node through the single-polarized antenna array; and
a polarization angle control unit configured to control a polarization angle of the single-polarized antenna array, wherein the polarization angle control unit is configured to switch according to the polarizations of the antenna array of the central office node.

9. The remote node of claim 8 being a base station that is connected to a core network via the central office node in a wireless backhaul network.

10. A wireless communication method of a central office node to communicate with a plurality of remote nodes, the wireless communication method comprising:
being provided with a first antenna array and a second antenna array, which have different polarization characteristics from each other; and
transmitting data using beam patterns generated during beamforming and polarization of each of the antennae arrays,
wherein an angle between the beam patterns is calculated based on a distance between a transmitter antenna and a receiver antenna and a distance between remote nodes.

11. The wireless communication method of claim 10, wherein one of the first antenna array and the second antenna array has vertical polarization and the other has horizontal polarization.

12. The wireless communication method of claim 10, wherein:
the transmission of the data comprises:
if an angle between beam patterns to be transmitted is greater than a predefined reference angle, transmitting data using beam patterns through a plurality of antennas, and
if the angle between beam patterns is smaller than the reference angle, transmitting data using, at least once, each of the first antenna array and the second antenna array, which have different polarizations from each other.

13. The wireless communication method of claim 10, wherein:
the transmission of the data comprises:
dividing entire data into pieces of data to be transmitted to the respective remote nodes,
modulating the divided pieces of data, and
forming beam patterns by allocating the modulated data to the respective first and second antenna arrays, which have different polarizations.

14. The wireless communication method of claim 10, further comprising:
receiving data through each of the first and second antenna arrays.

15. The wireless communication method of claim 14, wherein the receiving of the data comprises receiving data through the first antenna array by forming a first beam pattern, receiving data through the second antenna array by forming a second beam pattern, demodulating each of the received data; and combining the demodulated data.

16. The wireless communication method of claim 10, wherein the central office node and the plurality of remote nodes transmit and receive data therebetween in a wireless backhaul network.

* * * * *